United States Patent [19]

Chandler et al.

[11] Patent Number: 4,930,139
[45] Date of Patent: May 29, 1990

[54] SPREAD SPECTRUM COMMUNICATION SYSTEM

[75] Inventors: Donald G. Chandler, Princeton; Steve J. Nossen, Somerset; Raymond W. Simpson, Hamilton Square, all of N.J.

[73] Assignee: O'Neill Communications, Inc., Princeton, N.J.

[21] Appl. No.: 359,206

[22] Filed: May 31, 1989

[51] Int. Cl.⁵ ............................................. H04K 1/00
[52] U.S. Cl. .......................................... 375/1; 380/9; 380/49
[58] Field of Search .................. 375/1; 380/9, 49, 50, 380/34

[56] References Cited

U.S. PATENT DOCUMENTS

| | | | |
|---|---|---|---|
| 4,418,393 | 4/1983 | Zscheile, Jr. | 375/1 |
| 4,431,865 | 2/1984 | Bernede et al. | 380/50 |
| 4,447,672 | 3/1984 | Nakamura | 380/50 |
| 4,659,549 | 3/1987 | Halpern et al. | 375/1 |
| 4,862,478 | 8/1989 | McIntosh | 375/1 |
| 4,862,479 | 8/1989 | Hamatsu | 375/1 |
| 4,866,735 | 9/1989 | Mori et al. | 375/1 |

*Primary Examiner*—Salvatore Cangialosi
*Attorney, Agent, or Firm*—Richard C. Woodbridge

[57] ABSTRACT

The spread spectrum digital communication system includes data input devices for generating digital information signals to be transmitted using radio signals. A chip stream generator converts the data bits into chip streams that are either complemented or not complemented via an exclusive-OR gate, depending on the data bits. A scrambler further randomizes the chip stream for transmission. The receiver includes a descrambler and a correlator or digital matched filter for detecting the data signal. A modified receiver includes a sampler for sampling the scrambled signal at a rate which is the multiple of the chip rate thereby eliminating any need for recovering the chip clock. Another modified version includes a receiver having means for generating multi-level signals indicating the quality of the probable detection.

19 Claims, 6 Drawing Sheets

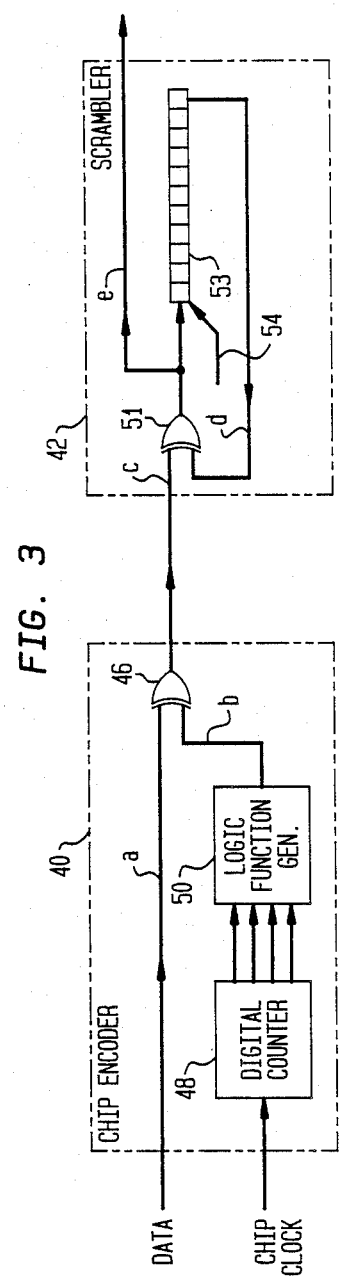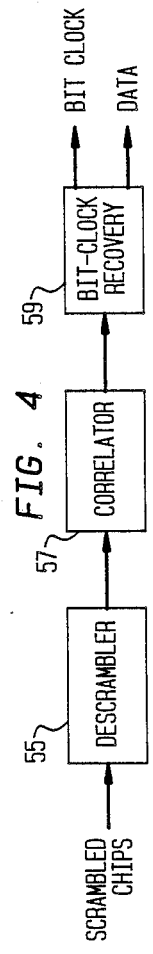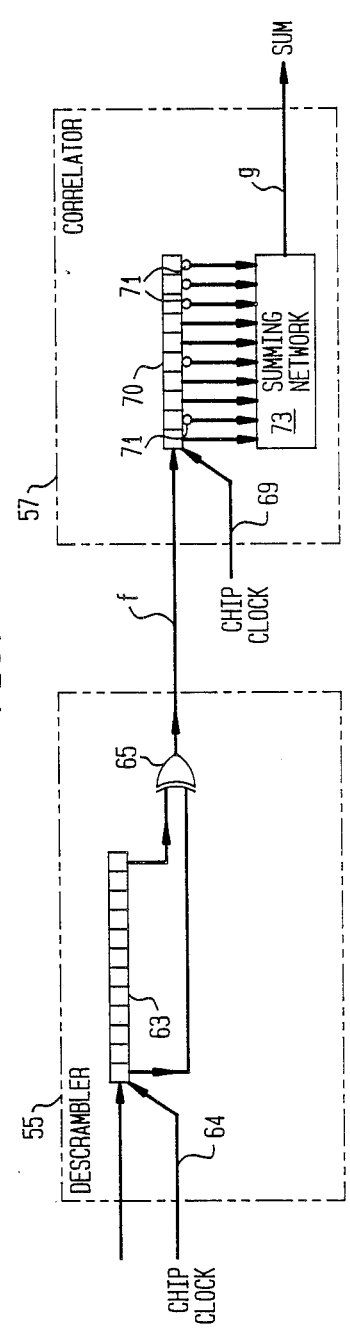
FIG. 3
FIG. 4
FIG. 5

FIG. 6A

| 1 | 2 | 3 | 4 | 5 | 6 | 7 | 8 | 9 | 10 |
|---|---|---|---|---|---|---|---|---|---|
| TRANSMIT DATA BITS | COUNT VALUE | CHIP SEQUENCE | TRANSMIT CHIPS | SCRAM-BLED CHIPS | UNSCRAM-BLED CHIPS | CORR-ELATOR SUM | SCAM-BLED CHIPS W/ RECEIVE ERRORS | UNSCRAM-BLED CHIPS | CORR-ELATOR SUM |
| a | b | c | d | e | f | g | | | |
| 1 | 0 | 1 | 0 | | | | | | |
|   | 1 | 1 | 0 | | | | | | |
|   | 2 | 1 | 0 | | | | | | |
|   | 3 | 0 | 1 | | | | | | |
|   | 4 | 0 | 1 | | | | | | |
|   | 5 | 1 | 0 | | | | | | |
|   | 6 | 0 | 1 | | | | | | |
|   | 7 | 0 | 1 | | | | | | |
|   | 8 | 1 | 0 | | | | | | |
|   | 9 | 0 | 1 | | | | | | |
| 1 | 0 | 1 | 0 | 0 | 0 | 10 | 0 | 0 | 9 |
|   | 1 | 1 | 0 | 0 | 0 | 5 | 0 | 1 | 4 |
|   | 2 | 1 | 0 | 0 | 0 | 4 | 0 | 0 | 4 |
|   | 3 | 0 | 1 | 1 | 1 | 7 | 1 | 1 | 7 |
|   | 4 | 0 | 1 | 1 | 1 | 4 | 1 | 1 | 4 |
|   | 5 | 1 | 0 | 0 | 0 | 5 | 0 | 0 | 5 |
|   | 6 | 0 | 1 | 1 | 1 | 6 | 1 | 1 | 6 |
|   | 7 | 0 | 1 | 1 | 1 | 3 | 1 | 1 | 3 |
|   | 8 | 1 | 0 | 0 | 0 | 6 | 0 | 0 | 6 |
|   | 9 | 0 | 1 | 1 | 1 | 5 | 1 | 1 | 5 |
| 0 | 0 | 1 | 1 | 1 | 1 | 0 | 1 | 1 | 0 |
|   | 1 | 1 | 1 | 1 | 1 | 6 | 1 | 1 | 6 |
|   | 2 | 1 | 1 | 1 | 1 | 6 | 1 | 1 | 6 |
|   | 3 | 0 | 0 | 0 | 0 | 4 | 0 | 0 | 4 |
|   | 4 | 0 | 0 | 1 | 0 | 6 | 1 | 0 | 6 |
|   | 5 | 1 | 1 | 0 | 1 | 6 | 0 | 1 | 6 |
|   | 6 | 0 | 0 | 0 | 0 | 6 | 0 | 0 | 6 |
|   | 7 | 0 | 0 | 1 | 0 | 4 | 1 | 0 | 4 |
|   | 8 | 1 | 1 | 0 | 1 | 6 | 0 | 1 | 6 |
|   | 9 | 0 | 0 | 0 | 0 | 6 | 0 | 0 | 6 |
| 0 | 0 | 1 | 1 | 0 | 1 | 0 | 0 | 1 | 0 |
|   | 1 | 1 | 1 | 0 | 1 | 6 | 0 | 1 | 6 |
|   | 2 | 1 | 1 | 0 | 1 | 6 | 0 | 1 | 6 |
|   | 3 | 0 | 0 | 1 | 0 | 4 | 1 | 0 | 4 |
|   | 4 | 0 | 0 | 0 | 0 | 6 | 0 | 0 | 6 |
|   | 5 | 1 | 1 | 0 | 1 | 6 | 0 | 1 | 6 |
|   | 6 | 0 | 0 | 0 | 0 | 6 | 0 | 0 | 6 |
|   | 7 | 0 | 0 | 0 | 0 | 4 | 0 | 0 | 4 |
|   | 8 | 1 | 1 | 0 | 1 | 6 | 0 | 1 | 6 |
|   | 9 | 0 | 0 | 0 | 0 | 6 | 0 | 0 | 6 |
| 0 | 0 | 1 | 1 | 1 | 1 | 0 | 1 | 1 | 0 |
|   | 1 | 1 | 1 | 1 | 1 | 5 | 1 | 1 | 5 |
|   | 2 | 1 | 1 | 1 | 1 | 6 | 1 | 1 | 6 |
|   | 3 | 0 | 0 | 0 | 0 | 3 | 0 | 0 | 3 |
|   | 4 | 0 | 0 | 1 | 0 | 6 | 1 | 0 | 6 |

FIG. 6B

|   |   |   |   |   |   |   |   |   |   |
|---|---|---|---|---|---|---|---|---|---|
|   | 5 | 1 | 1 | 1 | 1 | 5 |   | 1 | 1 | 5 |
|   | 6 | 0 | 0 | 0 | 0 | 4 |   | 0 | 0 | 4 |
|   | 7 | 0 | 0 | 0 | 0 | 7 |   | 0 | 0 | 7 |
|   | 8 | 1 | 1 | 1 | 1 | 4 |   | 1 | 1 | 4 |
|   | 9 | 0 | 0 | 0 | 0 | 5 |   | 0 | 0 | 5 |
| 1 | 0 | 1 | 0 | 0 | 0 | 10 |   | 0 | 0 | 10 |
|   | 1 | 1 | 0 | 1 | 0 | 4 |   | 1 | 0 | 5 |
|   | 2 | 1 | 0 | 1 | 0 | 4 |   | 1 | 0 | 3 |
|   | 3 | 0 | 1 | 0 | 1 | 6 |   | 0 | 1 | 7 |
|   | 4 | 0 | 1 | 1 | 1 | 4 |   | 1 | 1 | 5 |
|   | 5 | 1 | 0 | 1 | 0 | 4 |   | 1 | 0 | 3 |
|   | 6 | 0 | 1 | 0 | 1 | 4 |   | 0 | 1 | 5 |
|   | 7 | 0 | 1 | 1 | 1 | 6 |   | 1 | 1 | 7 |
|   | 8 | 1 | 0 | 0 | 0 | 4 |   | 0 | 0 | 3 |
|   | 9 | 0 | 1 | 0 | 1 | 4 |   | 0 | 1 | 3 |
| 1 | 0 | 1 | 0 | 0 | 0 | 10 |   | (1) | 1 | 9 |
|   | 1 | 1 | 0 | 0 | 0 | 5 |   | 0 | 0 | 5 |
|   | 2 | 1 | 0 | 1 | 0 | 4 |   | 1 | 0 | 3 |
|   | 3 | 0 | 1 | 0 | 1 | 7 |   | 0 | 1 | 7 |
|   | 4 | 0 | 1 | 1 | 1 | 4 |   | 1 | 1 | 4 |
|   | 5 | 1 | 0 | 1 | 0 | 5 |   | 1 | 0 | 3 |
|   | 6 | 0 | 1 | 0 | 1 | 6 |   | 0 | 1 | 6 |
|   | 7 | 0 | 1 | 1 | 1 | 3 |   | 1 | 1 | 3 |
|   | 8 | 1 | 0 | 1 | 0 | 6 |   | 1 | 0 | 5 |
|   | 9 | 0 | 1 | 1 | 1 | 5 |   | 1 | 1 | 4 |
| 0 | 0 | 1 | 1 | 1 | 1 | 0 |   | 1 | 1 | 4 |
|   | 1 | 1 | 1 | 1 | 1 | 5 |   | 1 | 0 | 7 |
|   | 2 | 1 | 1 | 1 | 1 | 6 |   | (0) | 0 | 7 |
|   | 3 | 0 | 0 | 1 | 0 | 3 |   | 1 | 0 | 5 |
|   | 4 | 0 | 0 | 0 | 0 | 5 |   | 0 | 0 | 5 |
|   | 5 | 1 | 1 | 0 | 1 | 5 |   | 0 | 1 | 5 |
|   | 6 | 0 | 0 | 1 | 0 | 4 |   | 1 | 0 | 4 |
|   | 7 | 0 | 0 | 0 | 0 | 4 |   | (1) | 1 | 2 |
|   | 8 | 1 | 1 | 0 | 1 | 4 |   | 0 | 1 | 3 |
|   | 9 | 0 | 0 | 1 | 0 | 5 |   | (0) | 1 | 4 |

SPREAD SPECTRUM COMMUNICATION SYSTEM

BACKGROUND OF THE INVENTION

1. Field of the Invention

The present invention relates to digital communication systems, and more particularly pertains to a system that employs spread spectrum techniques for signal transmissions.

2. Description of the Prior Art

The use of spread spectrum techniques for the transmission of signals by radio, radar, television, etc. is well known. It is generally understood that spread spectrum communication systems have a number of advantages over other systems. For example, spread spectrum communication systems are particularly useful in resisting external interference, operating with low energy spectral density, providing multiple-access capability without external control, and making it difficult for unauthorized receivers to observe the message. Clearly, in the past, many of these features have made the use of spread spectrum techniques of special importance in military communications. Important non-military applications of spread spectrum communication have also been proposed.

For instance, because a plurality of spread spectrum systems can operate without mutual interference, the Federal Communication Commission (FCC) has encouraged its commercial use by designating a frequency band over which unlicensed operators may transmit properly generated spread spectrum signals. One important processing standard set by the FCC is the amount of randomizing required in the spread spectrum transmissions. The FCC has specified that the transmissions should have a degree of randomness similar to that of a code having at least some specified number of chips, presently this number is 127 chips. Of course, the randomness standard is important for all spread spectrum systems if interference is to be avoided when using the same or adjacent bands.

One of the most critical problems confronting designers of digital communication systems that employ spread spectrum techniques is to accomplish the required randomness while conserving bandwidth and increasing bit transmission speed. The present invention fulfills this need.

SUMMARY OF THE INVENTION

The general purpose of this invention is to provide a spread spectrum communication system that achieves a level of randomness that is significantly greater than that afforded by the size of the chip code employed by the system. As such, bandwidth is conserved while bit transmission speed is maximized. To attain this, the present invention contemplates a unique combination of a chip stream generator for coding an information signal, and a scrambler for scrambling the coded information signal to increase its randomness before transmission. Also provided are a receiver having means for descrambling the received signal and a data detector for recovering the original signal.

It is, therefore, an object of the present invention to provide a communication system intended for the efficient communication of a digital data bit stream using spread spectrum techniques.

Another object is to provide a means for increasing the randomness of a coded signal while conserving bandwidth and bit transmission rate.

A further object of the invention is the provision of a spread spectrum communication system having a means for receiving a randomized coded signal such that errors are minimized.

The exact nature of the invention, as well as other objects and advantages thereof, will be readily apparent from consideration of the following specification relating to the annexed drawing.

BRIEF DESCRIPTION OF THE DRAWING

FIG. 3 is a detailed schematic of a portion of the system shown in FIG. 2.

FIG. 4 is a block diagram of a portion of the receiver shown in FIG. 2.

FIG. 5 is a detailed schematic of a portion of the receiver shown in FIG. 4.

FIGS. 6A and 6B are charts showing the signals appearing at various points in the diagrams of FIGS. 1-5.

DETAILED DESCRIPTION OF THE PREFERRED EMBODIMENTS

The present invention involves the use of a chip sequence in a spread spectrum communication system. The term "chip sequence", conforming to conventional usage, refers to the use of a plurality of bits, called chips, which are used as a set to encode each of the data bits. In the following description, the disclosed chip sequence employs a chip code having a set of ten chips; the number ten being chosen only for convenience to illustrate the preferred embodiment. As will become clear to those skilled in these arts, chip sequences having a smaller or larger number of chips may be used to practice the present invention. Also, because the size of the chip sequence is ten chips, many of the elements used to illustrate the preferred embodiment will have a particular size which should not be construed as limiting.

Figure 1:
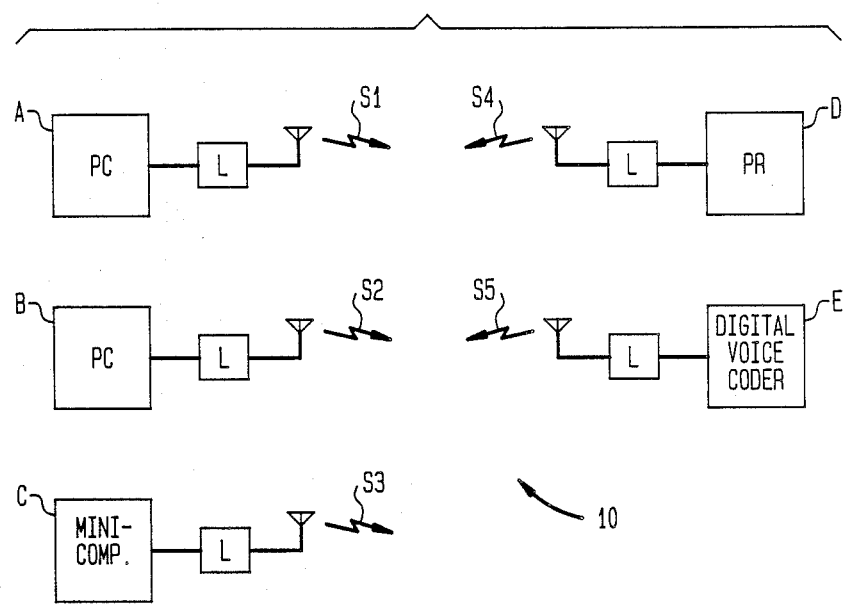
FIG. 1 is a block diagram of a preferred embodiment showing a communication system made in accordance with the present invention.

FIG. 1 shows a digital communication system 10 using the principles of the present invention. System 10 is shown to have a plurality of subsystems A-E capable of transmitting and receiving signals S1-S5 The subsystems A-E represent the components of a typical computer system interconnected by a local area network. As can be seen in FIG. 1, the local area network is wireless and employs the use of radio signals S1-S5 generated in network boxes L to communicate between the subsystems A-E. Subsystems A and B are similar and each include a microcomputer connected to a network box L. Subsystem C depicts a typical minicomputer connected to a network box L. Subsystem D shows a computer peripheral PR, such as a printer, an x—y plotter, or the like, also connected to a network box L. Subsystem E represents a digital voice coder connected to its network box L. A typical subsystem 10 could, of course, have substantially more subsystems than shown in FIG. 1. Each subsystem A-E would be connected to its network Box L by an RS-232 cable.

In operation, the subsystems A–E communicate with each other for the purpose of exchanging data, sharing peripherals, and the like. As known to those skilled in these arts, there are many standardized communications protocols that may be used by system 10 to effect proper communication between the subsystems A–E. In general, communications take place between subsystems A–E via the network boxes L which are each capable of broadcasting a radio signal S through space and receiving such signals. The information transmitted in a particular broadcast signal S may be intended for use by only one, a few, or all of the subsystems A–E. In any case, signals S1–S5 will normally include the information to be transmitted plus the conventional control signals and protocol signals necessary for proper operation.

Figure 2:
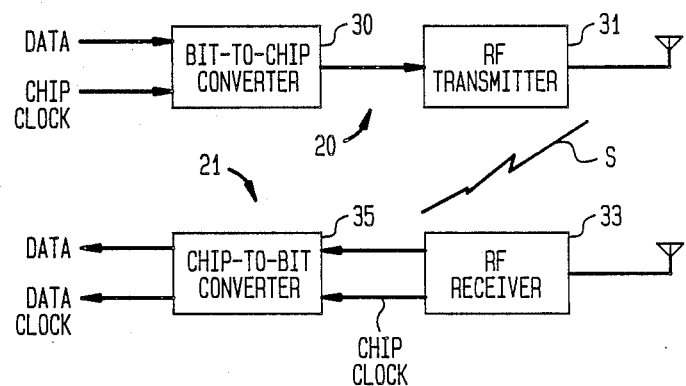
FIG. 2 is a block diagram, showing in greater detail a portion of the system shown in FIG. 1.

According to the principles of the present invention, network boxes L would also each include an appropriate spread spectrum transmitter system 20 and receiver system 21 (FIG. 2). The transmitter system 20 is shown to include a bit-to-chip converter 30 having a data input line and a chip clock input line. The output of converter 30 is connected to the input of an RF transmitter 31 for transmitting signal S. Signal S is received by an RF receiver 33 that is connected to a chip-to-bit converter 35 having a data line and a data clock output line.

FIG. 3 shows the details of bit-to-chip converter 30, the front portion of which is a chip encoder 40 that has an output connected to scrambler 42. Encoder 40 is connected to the data input line and the chip clock input line. The data input line is connected to one input (a) of an exclusive-OR gate 46. The second input (b) to exclusive-OR gate 46 is derived from the output of a chip sequence generator composed of a digital counter 48 and a logic function generator 50. In scrambler 42, an exclusive-OR gate 51 has one input (c) connected directly to the output of gate 46 and its second input (d) connected to the last or eleventh stage of an 11-bit shift register 53. It is noted here that register 53 is shown as having eleven stages for convenience only and to accommodate the size of the chip sequence which in the present example is ten chips long. As will become evident to those skilled in these arts, registers having a different number of stages are also possible and, in fact, may even be necessary when a different size chip sequence is used. The output of gate 51 is connected to the first stage of shift register 5 and to the output line (e) of scrambler 42. Shift register 53 includes a clock input terminal 54 to which the chip clock signal is applied for providing shift pulses to register 53.

The operation of the bit-to-chip converter 30, i.e., the chip encoder 40 plus the scrambler 42, is as follows: A data bit stream to be communicated is typically generated by external means, e.g., a digital voice coder, a computer, a printer, etc. (FIG. 1) and transmitted to a network box L via an RS 232 cable or other suitable transmission means. It is noted that it is also likely that a typical network box L might itself generate data for transmission. After entering box L, the data is properly formatted for use by the network in a conventional manner. The resulting 15 data then enters the transmitter system 20 of network box L via the data input line of chip encoder 40 (FIG. 2). Each subsystem A–E generates or is supplied with a master clock signal that is used to generate the data bits. A chip clock signal, also derived from the master clock, is applied to the chip clock input line of chip encoder 40. The chip clock signal is counted in groups of ten by digital counter 48 that has four parallel output lines that provide counts from 0 to 9 and then recycles. It is again noted that a number other than ten may be used. The logic function generator 50, in response to the digital count represented by the four bits produced by counter 48, will generate a predetermined series of ten chips to form the chip sequence. The ten chips or chip sequence will, in general, be a pseudorandom code referred to herein as a chip code. For purposes of illustration only, the chip code used herein will have the following form: 1110010010. As such, generator 50 may simply be a ROM programmed to produce the appropriate chip sequence as the counter 48 steps through its counting cycle. The chips will each have a pulse period equal to one-tenth the pulse period of the data bits. Other types of circuits may also be used to produce the chip sequence. For example, it is contemplated that a coder of the type having a shift register with feedback may be used to implement generator 50.

The exclusive-OR gate 46 gates the chip sequences on input (b) with each of the data bits on input (a) to produce an output signal, called a chip stream, that is either the chip sequence or the complement of the chip sequence depending on the data bit. The chip stream is then scrambled in scrambler 42. The chip stream on input (c) is gated by exclusive-OR gate 51 with an 11-bit delayed version of the output of the exclusive-OR gate 51 derived from the last stage of the 11-bit digital shift register 53. Finally, the output (e) of gate 51 is fed to the RF transmitter 31 wherein the now scrambled chip stream is transmitted by transmitter means using conventional modulation techniques such as frequency or phase shift keying.

With particular reference to FIG. 4, after the signal S is demodulated by RF receiver 33, it is fed to the input of chip-to-bit converter 35 which includes as its first stage a descrambler 55. The output of descrambler 55 is inputted to a correlator 57, shown here as a digital matched filter, for detection.

As seen in FIG. 5, the descrambler 55, similar to scrambler 42, includes a 12-stage digital shift register 63 whose first and last stages are tapped to provide inputs to an exclusive-OR gate 65. The shift register 63 has the input to its first stage connected to the output of receiver 33 and its shift terminal 64 connected to the output of a conventional chip clock recovery device in receiver 33. A phase-locked loop detector may be employed by receiver 33 in a conventional manner to recover the chip clock signal. In effect, the exclusive-OR gate 65 gates the received signal with an 11-bit delayed version of the received signal, thereby reversing the effects of scrambler 42, except for any errors that were generated as a result of the transmission. Also, to invert the effects of scrambling, a sufficient number of bits must have entered the descrambler 55 to flush any initial unknown state.

Errors in the received chip stream will produce an error in the descrambled chip stream each time the chip error is in a tapped position of the descrambler shift register 63. Therefore, each received chip error will generally produce two descrambled chip errors using the two-tap descrambler 63, although it is possible that chip errors with the correct spacing will occasionally cancel each other. It is highly desirable to ensure that these related chip errors do not all fall within one data bit time, i.e., for the present example, 10 chip times in the present 10 chip-per-bit system. This criterion determines the desired tap spacing in the scrambler 53 and descrambler 63. In a 10 chip-per-bit system as shown herein, the taps should be at least 10 chips apart. A further consideration is that the taps should not be equally spaced to avoid unusual error feedback conditions. So, in a 10 chip-per-bit system, if three taps are used, taps at positions 0, 10 and 21 are an acceptable choice. Likewise, for a 16 chip-per-bit system, taps at positions 0, 16 and 33 are acceptable. In the present two-tap descrambler 63, the choice of 0 and 11 is acceptable.

The output of descrambler 55 is next detected in a matched filter in correlator 57. The output of exclusive-OR gate 65 is connected to the input of the first stage of a 10-stage shift register 70. The shift terminal 69 for register 70 is connected to the chip clock recovery device in receiver 33. Each of the ten stages of register 70 is tapped. A set of inverters 71 are connected to a number of the taps in accordance with the structure of the chip code used in the system and generated in generator 50. Because it is assumed here for purposes of illustration only, that the chip code has the form 1110010010, the inverters 71 are similarly placed in the ten taps of register 70 to complement the five outputs corresponding to the "1" chips in the chip code.

The resulting complemented and non-complemented tap positions are summed by a summing network 73 which tallies the number of "1" inputs. In the present 10 chip-per-bit system, this sum will range between zero and ten. In the absence of bit errors, this sum will be exactly zero or ten when the descrambled chips corresponding to a single transmitted data bit are correctly positioned to fill the ten stages of the correlator shift register 70. The sum will be exactly zero when the transmitted data bit was a "0" and exactly ten when the transmitted data bit was a "1". In the presence of chip errors, these numbers will move closer to the 10 center value of five, but it is clear that five or more chip errors from the descrambler 55 during a data bit time are needed to cause a bit error because bit decisions are made on the basis of whether the output sum is closer to zero or to ten.

When the chip stream is not correctly aligned in the register 70, an intermediate sum value near five is expected. The stored chip stream, being a pseudorandom code, is predetermined in such a way as to ensure this. Therefore, the sum output from network 73 is a sequence of numbers between zero and ten, which is generally near five, but approaches the extreme of zero or ten at a spacing of ten chip time periods.

FIG. 6 illustrates the series of bits that are present at various points in the instant system during the transmission of the following series of eight data bits, referred to here as "transmit data bits", listed in the first column: 11000110. As seen in FIG. 3, these eight data bits will appear at point (a) at the data clock rate. Simultaneously, under the influence of the chip clock signal, having a rate ten times greater than the data rate, counter 48 will produce sets of four counting bits each set having the values listed in the second column. In response, generator 50 will output a chip sequence at point (b) as listed in the third column. The output (c) of the exclusive-OR gate 46 is shown in the fourth column which repeats the same sequence of chips in the third column or the complement of the sequence in the third column depending on the value of the data bits in the first column. For example, a "1" in the transmit data bit (first column) will result in the complement of the chip sequence (third column) to occur at point (c)(fourth column).

The output of scrambler 42 at point (e)(column 5) is initially meaningless but then quickly becomes a predictable bit stream having a significantly higher degree of randomness than that of the series of transmit chips at point (c)(column 4). It can be seen from the chart that scrambling does not begin until count 4 in the third transmit data bit of column 1. The series of unscrambled chips appearing at the output of descrambler 55, point (f), is listed in the sixth column. The bits listed in the sixth column would be received assuming errorless transmission. The corresponding correlator sum from network 73, point (g), is listed in the seventh column. As can be seen from the series of correlator sum values (g), every tenth value is either a zero or a ten and the other values range from three to seven. Also, when the correlator sum (g) is equal to zero, it corresponds to a transmit data bit "0" (first column) and when it has a value ten it corresponds to a transmit data bit "1".

In summary, the transmit data bits at point (a) are encoded using a chip sequence of ten bits, thereby producing a sequence at point (c) that has greater randomness than the signal at point (a). The randomness of the transmit chips is further increased by the scrambler 42 before transmission as a radio signal S. The original data is readily detected after reception by receiver 33, unscrambling in descrambler 55 and then correlation in correlator 57.

Columns 8–10 in FIG. 6 demonstrate corresponding results to those found in columns 5–7, respectively, for a situation in which there were receive errors. The chips listed in column 8 represent the input to descrambler 55 and differ from the chips in column 5 for those chips circled in column 8. The circled chips represent errors. As can be seen, a single-chip error in a ten-chip series, i.e., the length of the register 70 in correlator 57, will produce only a minor difference in the sum output value of network 73, i.e., from ten to nine (column 10). However, a series of three errors in a ten-bit series will have a relatively larger effect on the sum output, i.e., from zero to four, but will still not produce an erroneous output since values from zero to five are interpreted as a "0" data bit and sums from six to ten are interpreted as a "1" data bit. Because the vast majority of the sums will equal either a zero or a ten in the same relative time slot for each cycle, e.g., the first chip time slot, and the remaining sums in the other time slots will have a value close to half the difference, i.e., 5, the data signal and the data clock may be easily recovered by a conventional recovery means 59 at the receiver 21 using threshold circuits and a phase-locked loop detector.

It is noted here that the degree of randomness achieved by first encoding the data with a ten-bit chip sequence and then scrambling it in accordance with the principles of the present invention will result in a transmission signal having a degree of randomness greater than that achieved in a conventional system using a chip sequence of 127 chips. Additionally, in the present scheme, the transmission rate will be significantly less, using ten bits-per-chip as compared to using 127 bits-per-chip without scrambling. The present scheme will also result in the transmission of a signal having a relatively narrower bandwidth than that required to transmit 127 bits-per-chip at the same data rate.

Figure 7:
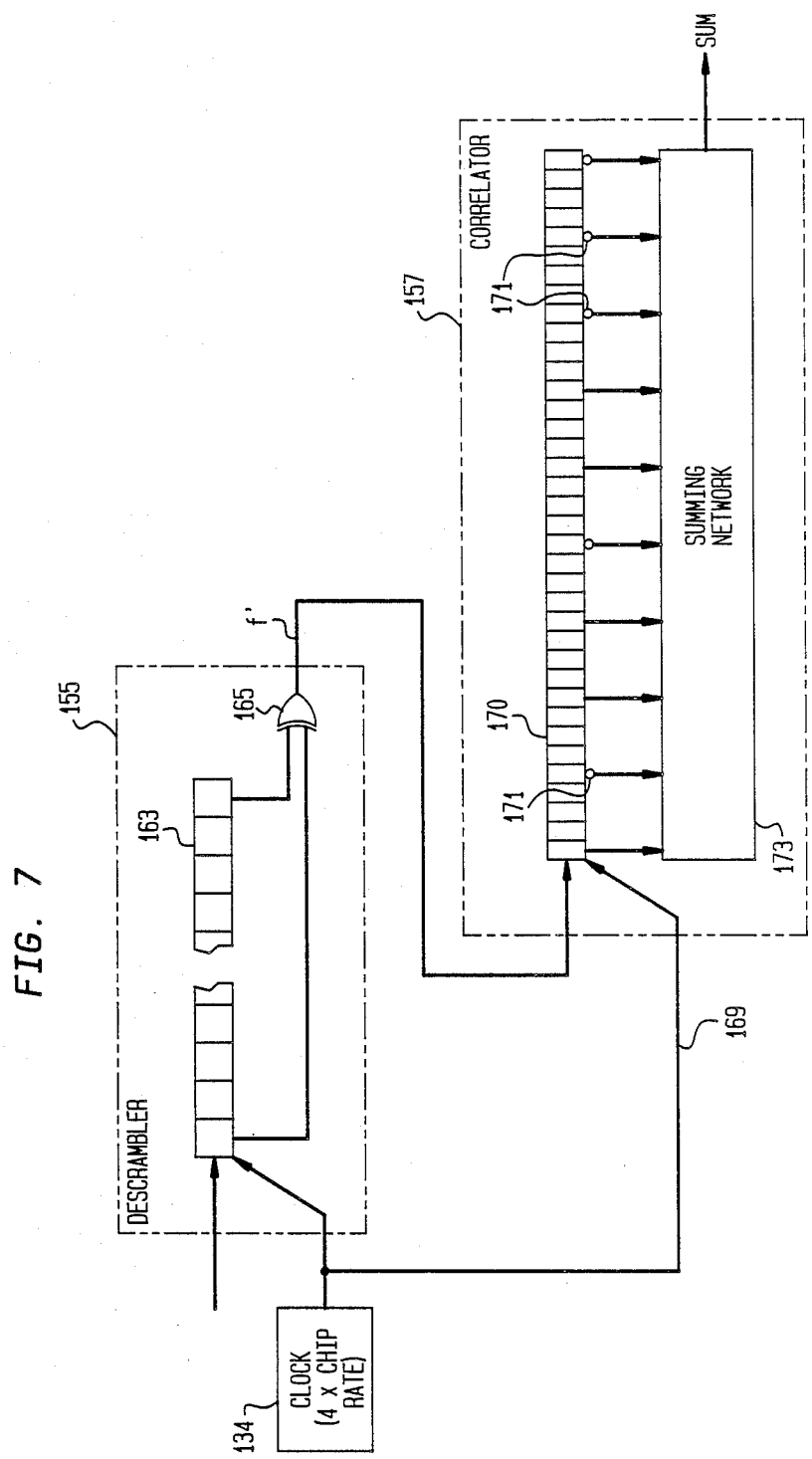
FIGS. 7 and 8 are detailed schematics, similar to FIG. 5, showing modifications of the present invention.

FIG. 7 shows a modified receiver 121 wherein recovery of the chip clock may be postponed indefinitely and merges this operation into the bit clock recovery operation. It is desirable to postpone chip clock recovery because errors in that operation can have catastrophic results for bit recovery. In this modified receiver system 121, the demodulated receiver output is sampled by a shift register 163 using an internal clock 134 having a clock rate at about four times the chip clock rate. This sampled stream is fed to a descrambler 163. The descrambler 163 is similar to the descrambler 63, described above, except that the taps are spaced four times further apart than previously. For example, in general if the transmitter scrambler taps are at positions 10 and 21, then the corresponding three descrambler taps will be at positions 0, 40 and 84. Scrambler 42, with a single tap at 11, (FIG. 3), requires that descrambler 155 have taps at 0 and 44. The descrambler output (f') is fed to a digital correlator 157, having a matched filter similar to that described above but having a shift register 170 about four times longer. The tap spacing and clock rate at descrambler 155 and correlator 157 must be equal. For example, a ten chip-per-bit sequence requires 4*(10−1)+1=37 stages. The tapped positions are 0, 4, 8, 12, 16, 20, 24, 28, 32, 36. The shift signals for register 170 are applied to clock terminal 169 and are derived from clock 134. The complementing pattern for inverters 171 is applied here as was applied above for inverters 71, and the 10 outputs are fed to an identical summing network 173. The output of this summing network 173 will vary between 0 and 10 in the same fashion as above, and the data signal and bit clock are extracted in the same manner by recovery device 59. Note that chip clock recovery need not be performed in this system.

The clock 134 is employed by the receiver to approximate the chip clock signal. The clock rate of clock 134 need not be exact and need not be in phase with the chip clock signal. As such, there will normally be a slow drift between the phase of the chip clock signal and the clock 134, thereby causing some jitter in the output. However, because there are four samples made for each chip, the matched filter output from summing network will generally still be possible by a conventional recovery device 59 using threshold circuits. Also, a conventional phase-locked loop detector may be used to recover the data clock as before. Of course, because there will be some drift in the output or because the sampling rate is not exact, the quality of the detected data signal will not always be the same. Improvements in detecting the data signal may be realized by determining the quality of the signal and using this result to operate the recovery device 59.

Figure 8:
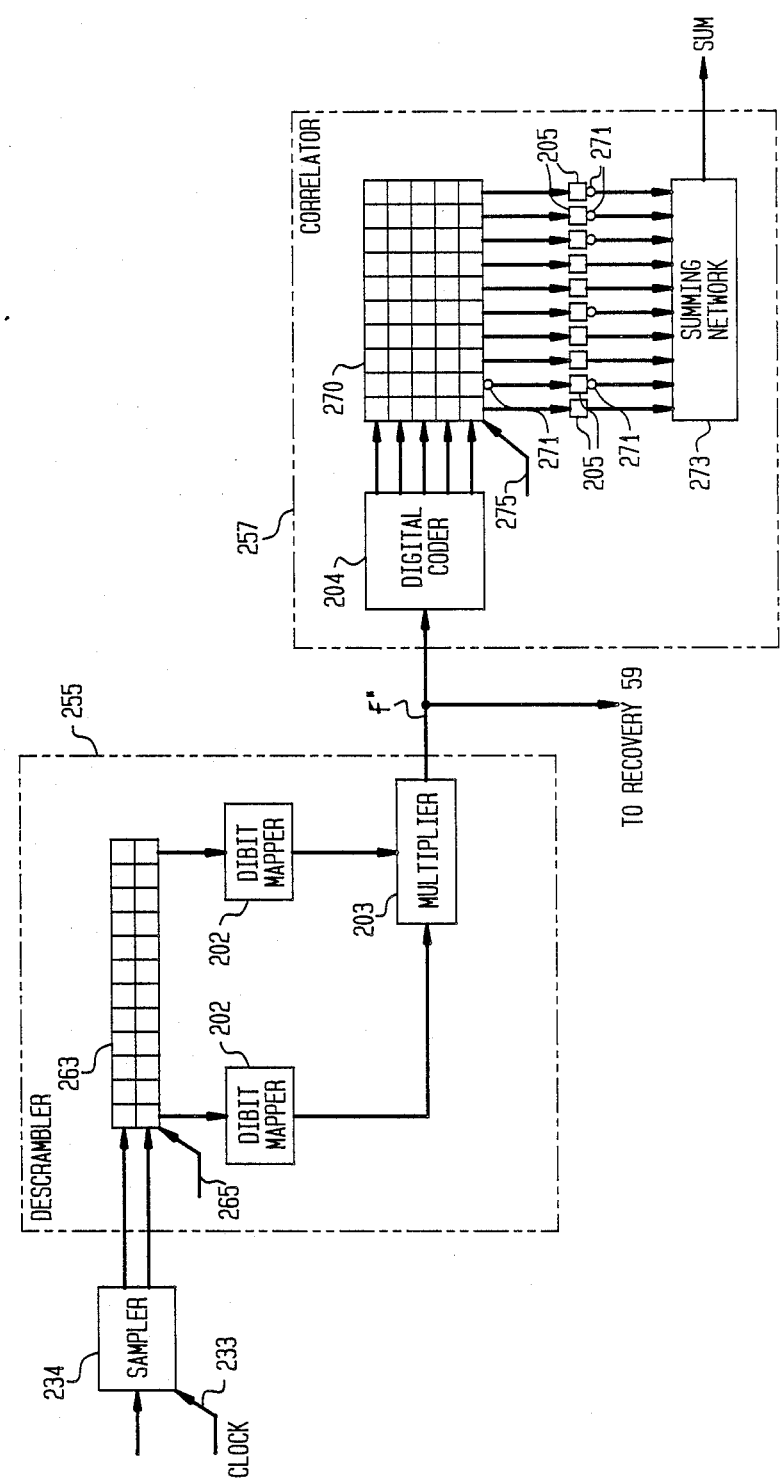

FIG. 8 shows a modified embodiment wherein a confidence-level signal is generated that may be used by the control signal of the phase-locked loop detector to improve detection. In FIG. 8, there is shown a further modified receiver 221 designed to carry multi-level information through its shift registers 263, 270 to provide a still further improvement in performance. In receiver 221, a sampler 234 produces multilevel information, called "dibits", upon sampling the output of the demodulator in RF receiver 33 under control of a clock applied to terminal 233. The clock signal in this case may be a recovered chip clock as shown in FIG. 5 or an internally generated multiple of the chip clock as described in FIG. 7. The present example assumes the use of a recovered chip clock. This recovered chip clock is also applied to the shift terminals 265 and 275 of shift registers 263 and 270, respectively. The dibits may be generated by sampler 234 as follows: 00 very likely a "0"; 01 likely a "0"; 10 likely a "1"; and 11 very likely a "1". Each dibit proceeds through dual shift register 263 of descrambler 255. The shift register 263 is tapped at the first and twelfth (or last) stages and then mapped by dibit mappers 201 and 202, e.g., D/A converters, to new values as follows: 00 to −3; 01 to −1; 10 to +1; and 11 to +3. These new values are fed to a multiplier 203 and then to a coder 204 having five outputs for encoding the product signal which will fall into six quantized levels between −9 and +9. The outputs of encoder 204, e.g., an A/D converter, are fed to correlator 257 having a 5×10 bit shift register 270 with the ten stages tapped by decoders 205, e.g., D/A converters, and inverted as before, i.e., with selective placement of inverters 271 as described earlier. It is noted that although each tap of register 263 includes two taps only one line is shown, one tap for each cell in stages 1 and 12. Likewise, for register 270 each stage has 5 taps, one for each cell. The summing network 273 produces a sum output as described earlier. It is noted that although the correlator 257 and encoder 204 use five bits to encode the apparent 19 values between −9 and +9, it will be clear to those skilled in these arts that since the results of descrambling at point (f") take on only six discrete values, viz. −9, −3, −1, +1, +3 and +9, these six values can be encoded as a three bit code.

In this modified version, the two mapped tapped dibits having results between −9 and +9 will, upon multiplication, produce a product signal at point (f") with a magnitude signifying the level of confidence in the descrambled result. Small magnitudes are low confidence results while large magnitudes are high confidence results. These results may be used in proportion to their confidence level to yield an improved detection of the data signal. The ten tapped outputs from shift register 270, each having one of six decoded values between −9 and +9, are summed by network 273 to produce a sum output between −90 and +90. Data bit values and data bit clock can again be derived from the sum signal by recovery 59 as described earlier. In this example, positive results will indicate the transmission of a "1" while negative results indicate the transmission of a "0". The confidence level of each detection is available at point (f') and may be fed forward to be used to control the oscillator in a phase-locked loop detector to vary the phase to increase the detection quality.

The basic building blocks of the present invention may be implemented from circuits that are readily available from a number of commercial sources. For example, Texas Instruments produces an exclusive-OR gate No. 74HC86 that may be used to implement gates 46, 51, 65 and 165; a shift register No. 74HC164 that may be used to implement registers 53, 63, 70, 163, 170, 263 and 270; and a summing network No. 74HC283 that may be used to implement networks 73, 173 and 273.

Obviously, many other modifications and variations of the present invention are possible in the light of the above teachings. It is, therefore, to be understood that within the scope of the appended claims, the invention may be practiced otherwise than as specifically described.

What is claimed is:

1. A digital communication system comprising:
    input means for inputting a digital information signal, at a data rate, to be transmitted;
    a chip stream generator means connected to said input means for converting said information signal into a chip stream having a chip rate greater than said data rate;

scrambler means for scrambling said chip stream to produce a scrambled chip stream signal; and output means connected to said scrambler means for transmitting said scrambled chip stream signal as a radio signal.

2. The system of claim 1 wherein said chip stream generator means includes a chip code generator means for generating an n-bit chip code for each data bit, and gate means for outputting the n-bit chip code or the complement of the n-bit chip code for different values of said data bit.

3. The system of claim 2 wherein said scrambler means includes means for scrambling said chip stream using a period of more than n chips.

4. The system of claim 1 further comprising:
a descrambler means connected to said scrambled chip stream;
a receiver means for receiving and detecting said receiver means for converting the detected scrambled chip stream into an unscrambled chip stream; and
a data detector means connected to said descrambler means for detecting said data signal.

5. The system of claim 4 wherein said detector means is a correlator.

6. The system of claim 5 wherein said correlator is a digital matched filter.

7. The system of claim 6 wherein said chip stream generator means includes a chip code generator means for generating an n-bit chip code for each data bit, and gate means for outputting the n-bit chip code or the complement of the n-bit chip code for different values of said data bit.

8. The system of claim 7 wherein said scrambler means includes means for scrambling said chip stream using a period of more than n chips.

9. The system of claim 1 further comprising:
a receiver means for receiving and detecting said transmitted scrambled chip stream;
a sampler means connected to said receiver means for sampling said detected scrambled chip stream at a sampling rate which is a multiple of the rate of said chip stream;
descrambler means connected to said sampler means for converting the output thereof into an unscrambled chip stream having a rate equal to said sampling rate; and
data detector means connected to said descrambler means for detecting said data signal.

10. The system of claim 9 wherein said detector means is a correlator.

11. The system of claim 10 wherein said correlator is a digital matched filter.

12. The system of claim 11 wherein said chip stream generator means includes a chip code generator means for generating an n-bit chip code for each data bit, and gate means for outputting the n-bit chip code or the complement of the n-bit chip code for different values of said data bit.

13. The system of claim 12 wherein said scrambler means includes means for scrambling said chip stream using a period of more than n chips.

14. The system of claim 1 further comprising:
a receiver means for receiving and detecting said transmitted scrambled chip stream;
a sampler means connected to said receiver means for sampling the detected chip stream and encoding the samples into a series of first multi-level signals as a function of the level of said sample;
descrambler means connected to said sampler means for descrambling said chip stream including converting the output thereof into a second multi-level signal; and
data detector means connected to said descrambler means for detecting said data signal.

15. The system of claim 14 wherein said descrambler means includes a multiplier means for multiplying at least two spaced values of said first multi-level signal to produce said second multi-level signal.

16. The system of claim 15 wherein said spaced values are spaced a distance greater than the length of one chip stream.

17. The system of claim 14 wherein said data detector means is a correlator.

18. The system of claim 17 wherein said correlator is a digital matched filter.

19. The system of claim 17 wherein said correlator includes a multi-level digital matched filter including means for digitally encoding said second multi-level signal.

* * * * *